United States Patent Office 2,826,587
Patented Mar. 11, 1958

2,826,587
PROCESS FOR MAKING 2-OXAZOLIDONES

Jack L. Trask and William F. Tousignant, Midland, Mich., assignors to The Dow Chemical Company, Midland, Mich., a corporation of Michigan No Drawing. Application August 24, 1956
Serial No. 605,954

6 Claims. (Cl. 260—307)

This invention relates to processes for the manufacture of 5-substituted 2-oxazolidones having the formula

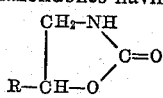

wherein R is a radical selected from the group consisting of hydrogen, lower alkyl and aryl radicals. By the term "lower alkyl" we mean alkyl radicals containing not more than four carbon atoms.

According to the invention, 2-oxazolidones are made readily and in high yield from a 2-aminoethyl carbamate by heating the latter at a temperature of about 130 to 225° C. and under a pressure of not more than about 3 mm. of mercury. Under these conditions, the oxazolidones are distilled from the reaction zone and condensed. They may be further purified, if desired, by distillation under vacuum or by crystallization from a suitable solvent, such as chloroform or benzene. The reaction involved in the process may be represented as follows:

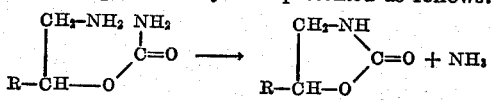

wherein R has the same significance as above. The β-aminoethyl carbamates used in this process and methods for their production are described in the copending application of one of us (William F. Tousignant) and Thomas Houtman, Jr., Serial No. 449,477, filed August 12, 1954.

The practice of the invention is illustrated by the following examples.

Example 1.—Preparation of 2-oxazolidone

Thirty-six grams of β-aminoethyl carbamate were placed in a glass still arranged for distillation under reduced pressure. The pot was gradually heated while the pressure was maintained at 2 to 3 mm. At a pot temperature of 162° C. distillation began and continued until a pot temperature of 220° was reached. The distillate was shown by infra-red analysis to consist of about 90 percent of 2-oxazolidone and 10 percent of β-aminoethyl carbamate. It could be further purified by redistillation in vacuum. The yield was 50 percent of the theoretical. A polymeric residue remained in the stillpot.

Example 2.—Preparation of 5-methyl-2-oxazolidone

In a manner similar to that described in Example 1, 57.4 g. of 1-methyl-2-aminoethyl carbamate was heated at 135 to 185° C. for 14 hours while 38.7 g. of distillate was collected. The distillate had $n_D^{25}$, 1.4683 and $d_4^{25}$, 1.182. Infra-red analysis showed it to be mainly 5-methyl-2-oxazolidone with 1 to 2 percent of unidentified impurity. The yield was 67.4 percent of the theoretical.

Example 3.—Preparation of 5-ethyl-2-oxazolidone

In a manner similar to that described in Example 1, 46 g. of 1-ethyl-2-aminoethyl carbamate was heated at 150 to 200° C. for 3 hours while 36.3 g. of distillate boiling in the range 120 to 130° at 0.2 to 0.9 mm. was collected. Upon redistillation, practically all the product boiled at 109° at 0.15 mm. The yield was 90 percent. Elementary analysis and infra-red absorption showed that the product was pure 5-ethyl-2-oxazolidone. It had $n_D^{25°}$ 1.4592; $d_4^{20}$, 1.147.

Example 4.—Preparation of 5-phenyl-2-oxazolidone

In a manner similar to that described in Example 1, 19.3 g. of 1-phenyl-2-aminoethyl carbamate was heated at a temperature of 140 to 200° C. and a pressure of 0.70 to 1.25 mm. During a 6 hour period 9.5 g. of distillate was collected (49 percent of theory). This crystallized on standing and was recrystallized from chloroform and benzene, after which it melted at 90 to 91° C. (lit., 88 to 90° C.).

The process of the invention is similarly applicable to the preparation of other 5-substituted 2-oxazolidones wherein the 5-substituent is a lower alkyl or an aryl group free of substituents that are reactive in the process to yield undesired by-products.

The 5-substituted 2-oxazolidones are a well known class of compounds. Besides being physiologically active they are readily hydrolyzed to 1-substituted 2-aminoethanols, this being a convenient method of preparing the latter in pure form, uncontaminated with secondary and tertiary alkanolamines.

We claim:

1. A process for making a 2-oxazolidone having the formula

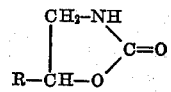

wherein R is a radical selected from the group consisting of hydrogen, lower alkyl and aryl free of reactive substituent radicals, said process comprising heating a 2-aminoethyl carbamate having the formula

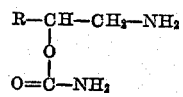

wherein R has the same significance as above, said heating being at a temperature in the range of about 130 to 225° C. and under a pressure not exceeding about 3 mm. of mercury, whereby the 2-oxazolidone is produced in vapor form, and condensing and recovering said 2-oxazolidone.

2. A process as in claim 1 wherein R is hydrogen.
3. A process as in claim 1 wherein R is the phenyl radical.
4. A process as in claim 1 wherein R is a lower alkyl radical.
5. A process as in claim 1 wherein R is the methyl radical.
6. A process as in claim 1 wherein R is the ethyl radical.

References Cited in the file of this patent
UNITED STATES PATENTS

| | | |
|---|---|---|
| 2,399,118 | Homeyer | Apr. 23, 1946 |
| 2,773,067 | Viard et al. | Dec. 4, 1956 |